US009081429B2

(12) United States Patent
Lai et al.

(10) Patent No.: US 9,081,429 B2
(45) Date of Patent: Jul. 14, 2015

(54) TOUCH CONTROL DEVICE

(75) Inventors: Jen-Cheng Lai, Taoyuan County (TW); Tung-Lung Lin, Taoyuan County (TW); Ge-Jhang He, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 431 days.

(21) Appl. No.: 13/328,626

(22) Filed: Dec. 16, 2011

(65) Prior Publication Data

US 2013/0154953 A1   Jun. 20, 2013

(51) Int. Cl.
*G02F 1/1333* (2006.01)
*G06F 3/0354* (2013.01)
*G02F 1/1335* (2006.01)
*G06F 3/041* (2006.01)

(52) U.S. Cl.
CPC ............ *G06F 3/041* (2013.01); *G06F 3/03547* (2013.01)

(58) Field of Classification Search
CPC .............. G02F 1/133308; G02F 2001/133314; G02F 2001/133317; G02F 2201/465; G02F 2001/13332; G02F 2001/133322; G02F 2202/28; G02F 2001/133311; G02F 2001/133328; G02F 2201/36; G06F 3/044; G06F 3/041; G06F 3/045; G06F 3/016; G06F 3/03547; G06F 1/1626; G06F 3/042; G06F 3/0414; G06F 3/046; G06F 1/1601
See application file for complete search history.

(56) References Cited

U.S. PATENT DOCUMENTS

| 7,768,591 B2* | 8/2010 | Chang et al. ............. 349/58 |
| 2008/0068342 A1* | 3/2008 | Chang et al. ............. 345/173 |
| 2011/0193789 A1* | 8/2011 | Lin ............. 345/173 |

FOREIGN PATENT DOCUMENTS

TW   200827831 A   7/2008

* cited by examiner

*Primary Examiner* — Bumsuk Won
*Assistant Examiner* — Angela Davison
(74) *Attorney, Agent, or Firm* — Birch, Stewart, Kolasch & Birch, LLP

(57) ABSTRACT

A touch control device is provided, comprising a touch control module, a display module, a connecting member, and a ventilation film. The connecting member connects the touch control module with the display module, wherein a chamber is formed between the connecting member, the touch control module, and the display module. Specifically, the connecting member comprises a protruding portion forming a passage and a hole, wherein the passage communicates the chamber with the hole. Additionally, the ventilation film is disposed on the protruding portion and covers the hole, wherein the air in the chamber is exhausted from the touch control device through the passage and the hole.

10 Claims, 3 Drawing Sheets

TOUCH CONTROL DEVICE

BACKGROUND OF THE INVENTION

1. Field of the Invention

The application relates in general to a touch control device and in particular to a touch control device having a ventilation film.

2. Description of the Related Art

Referring to FIG. 1, a conventional touch screen usually comprises a touch control module 10 and a display module 20. The touch control module 10 comprises a touch panel, and the display module 20 (such as a liquid crystal display module, LCM) and the touch control module 10 can be fixed to each other by a connecting member 12 (such as a rectangular hollow double sided tape).

As shown in FIG. 1, the connecting member 12 forms a space 121 at the center thereof, such that a hollow chamber is formed between the touch control module 10 and the display module 20 after assembly. In order to adjust the air pressure in the chamber, the connecting member 12 usually forms several holes connecting with the ambient. However, the holes may cause irruption of dust or objects which lead to damage of the components. It is therefore an object of the invention to improve the structure of the touch screen.

BRIEF SUMMARY OF INVENTION

An embodiment of the invention provides a touch control device, comprising a touch control module, a display module, a connecting member, and a ventilation film. The connecting member connects the touch control module with the display module, wherein a chamber is formed between the connecting member, the touch control module, and the display module. Specifically, the connecting member comprises a protruding portion forming a passage and a hole, wherein the passage communicates the chamber with the hole. Additionally, the ventilation film is disposed on a surface of the protruding portion and covers the hole, wherein the air in the chamber is exhausted from the touch control device through the passage and the hole.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
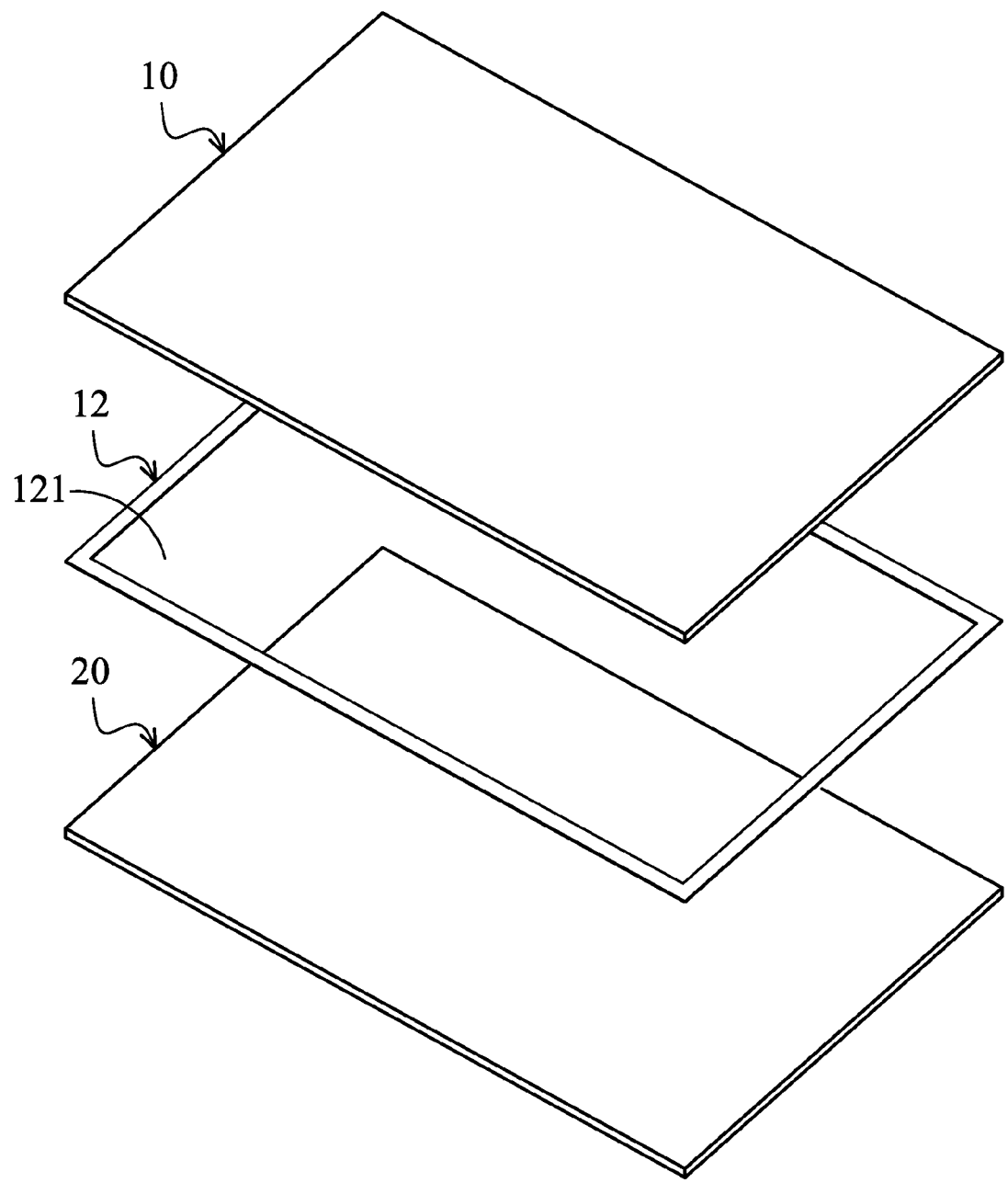
FIG. 1 is a exploded diagram of a conventional touch control device.
Figure 2:
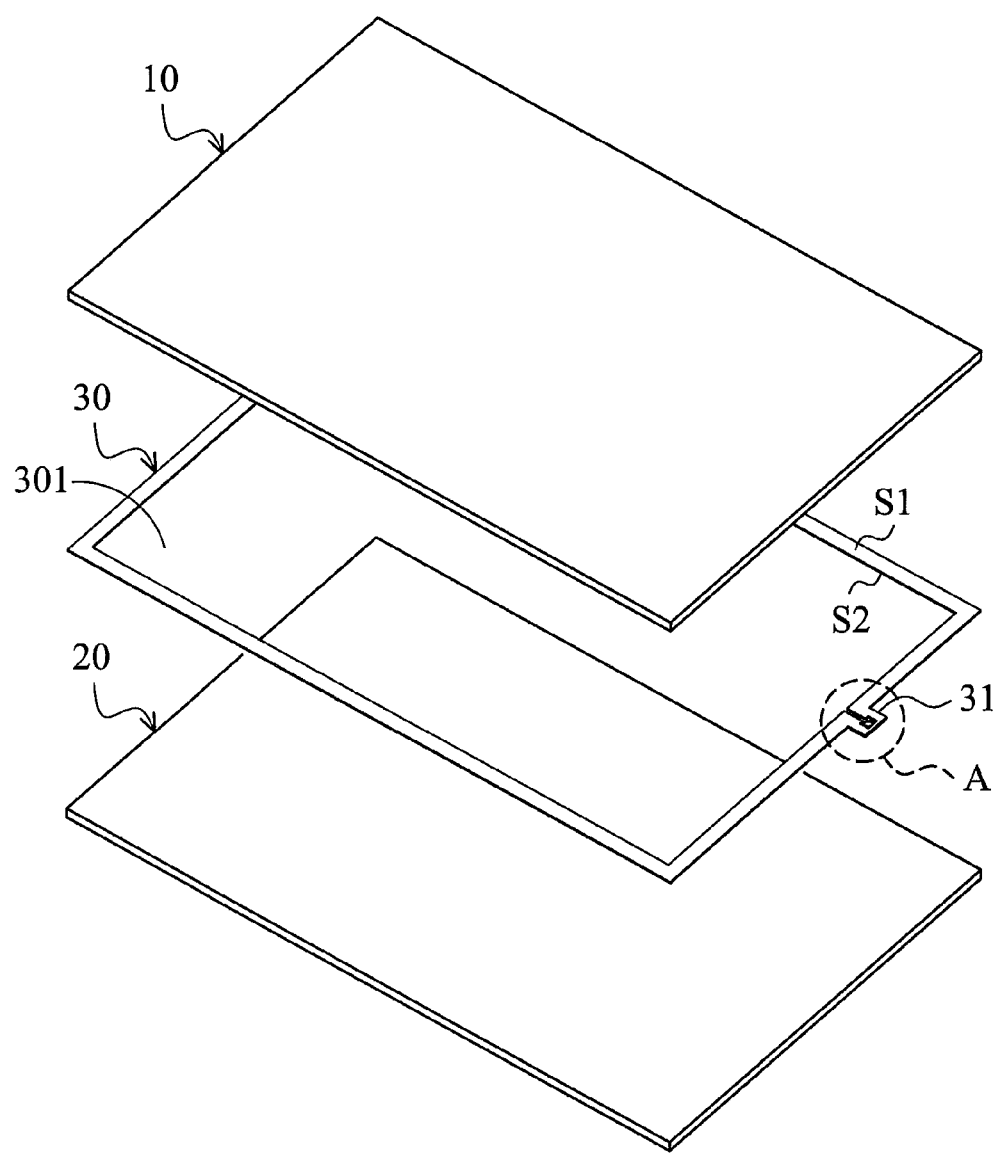
FIG. 2 is a exploded diagram of a touch control device.
Figure 3:
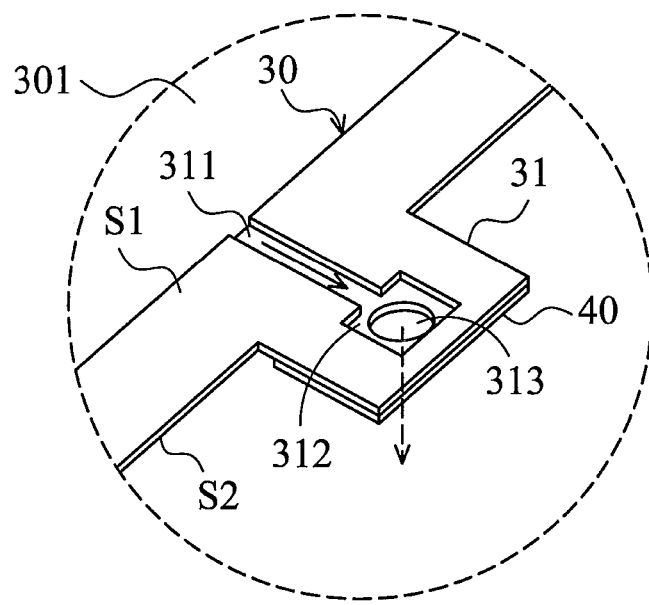
FIG. 3 is a large view of the portion A in FIG. 2.
Figure 4:
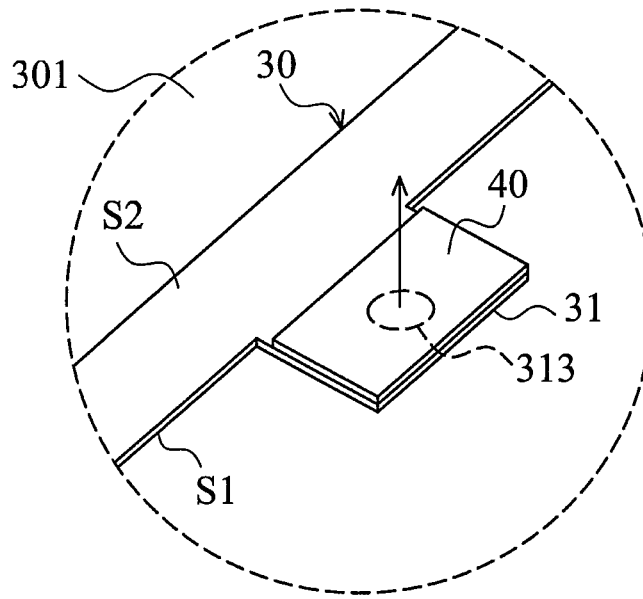
FIG. 4 is a perspective diagram of air exhausted from the touch control device through the hole and the ventilation film.

Referring to FIGS. 2-4, wherein FIG. 3 is a large view of the portion A in FIG. 2. As shown in FIGS. 2-4, an embodiment of a touch control device primarily comprises a touch control module 10, a display module 20, a hollow connecting member 30, and a ventilation film 40. The connecting member 30, such as a rectangular hollow double sided tape, is disposed between the touch control module 10 and the display module 20. The first side S1 and the second side S2 of the connecting member 30 connect to the touch control module 10 and the display module 20, respectively, so as to fix the touch control module 10 and the display module 20 to each other.

As shown in FIG. 2, the connecting member 30 forms a rectangular space 301 at the center thereof, such that a hollow chamber is formed between the touch control module 10 and the display module 20. As shown in FIGS. 2 and 3, the connecting member 30 comprises a protruding portion 31, a passage 311 and a recess 312 formed on a top surface of the protruding portion 31, and a hole 313 is formed on a bottom surface of the protruding portion 31. The hole 313 is formed through the bottom of the recess 312 and communicated with the recess 312. Additionally, the ventilation film 40 is disposed on the bottom surface of the protruding portion 31 and covers the hole 313.

It is noted that the top surface of the protruding portion 31 is tightly attached to the touch control module 10 during assembly, and the bottom surface of the protruding portion 31 and the ventilation film 40 protrude from the display module 20. Thus, air between the touch control module 10 and the display module 20 may enter the center recess 312 of the protruding portion 31 through the passage 311 when the touch control device is pressed or the outer air pressure declines. Thus, air can be exhausted smoothly from the touch control device through the hole 313, as the arrow indicates in FIGS. 3-4.

Referring to FIGS. 3-4, the protruding portion 31 and the recess 312 on the protruding portion 31 are substantially rectangular. The ventilation film 40 corresponding to the protruding portion 31 is also rectangular, and the hole 313 has a circular structure. Furthermore, a plurality of protruding portions 31 and holes 313 may be formed on one or more sides of the connecting member 30. Thus, the air in the touch control device can be exhausted from the device smoothly.

In this embodiment, the ventilation film 40 is made of air permeable and dust proof material, such as expanded polytetrafluoroethylene (ePTFE) or other porous-structure materials. Additionally, the ventilation film 40 may comprise metal wire mesh formed by a knitting or etching process. As mentioned above, since the ventilation film 40 is air permeable, the air between the touch control module 10 and the display module 20 can be exhausted through the hole 313 and the ventilation film 40 on the bottom surface of the protruding portion 31 when the touch control device is pressed or the outer air pressure declines. Additionally, the dust cannot invade of the touch control device through the ventilation film 40, thus preventing adverse influence on system efficiency and the damage of components.

It is noted that the passage 311 and the recess 312 in FIG. 3 may also be embedded in the protruding portion 31 and not exposed to the first side S1 of the connecting member 30. The protruding portion 31 may protrude from one side of the touch control module 10 and the display module 20, and form two holes 313 respectively on the top and bottom sides thereof, wherein each of the holes 313 may be covered by a ventilation film 40. Thus, the air between the touch control module 10 and the display module 20 may communicate with the ambience through the holes 313 and the ventilation film 40, so as to adjust the air pressure inside of the touch control device.

The invention provides a touch control device having at least one protruding portion disposed on the connecting member between the touch control module and the display module. The protruding portion forms the air passage and the hole so air between the touch control module and the display module may be exhausted from the touch control device in order to adjust the air pressure inside of the touch control device. Specifically, in the invention, the ventilation film disposed on the protruding portion covers the hole on the protruding portion. Thus, it not only allows for the circulation of air in the touch control device with the ambience but also prevents the irruption of dust or objects, so as to achieve air permeability and prevent objects from invading into the touch control device.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A touch control device, comprising:
   a touch control module;
   a display module;
   a connecting member, connecting the touch control module with the display module, wherein a chamber is formed between the connecting member, the touch control module, and the display module, wherein the connecting member comprises a rectangular hollow body and a protruding portion protruding outwardly from an outermost edge of the rectangular hollow body along a direction parallel to the display module, wherein the protruding portion includes a passage and a hole, and the passage communicates the chamber with the hole; and
   a ventilation film, disposed on the protruding portion and covering the hole, wherein air in the chamber is exhausted from the touch control device through the passage and the hole.

2. The touch control device as claimed in claim 1, wherein the connecting member is a rectangular and hollow double sided tape adhering the touch control module to the display module.

3. The touch control device as claimed in claim 1, wherein the protruding portion and the ventilation film are rectangular.

4. The touch control device as claimed in claim 1, wherein the ventilation film comprises ePTFE or metal material.

5. The touch control device as claimed in claim 1, wherein the ventilation film comprises a porous or mesh structure.

6. The touch control device as claimed in claim 1, wherein the ventilation film comprises metal material, and the ventilation film forms a wire mesh by a knitting or etching process.

7. The touch control device as claimed in claim 1, wherein one side of the protruding portion is completely attached to the touch control module.

8. The touch control device as claimed in claim 1, wherein the protruding portion protrudes from the display module.

9. The touch control device as claimed in claim 1, wherein the protruding portion further includes a recess connecting the passage with the hole, and the hole is formed on a bottom side of the recess.

10. The touch control device as claimed in claim 9, wherein the recess and the passage are embedded in the protruding portion.

* * * * *